United States Patent [19]

Copeland et al.

[11] Patent Number: 4,533,833

[45] Date of Patent: Aug. 6, 1985

[54] OPTICALLY COUPLED INTEGRATED CIRCUIT ARRAY

[75] Inventors: John A. Copeland, Fair Haven; Stewart E. Miller, Locust, both of N.J.

[73] Assignee: AT&T Bell Laboratories, Murray Hill, N.J.

[21] Appl. No.: 409,401

[22] Filed: Aug. 19, 1982

[51] Int. Cl.³ ............................................. G02B 27/00
[52] U.S. Cl. ....................................... 250/551; 357/19
[58] Field of Search ....................... 250/551, 216, 239; 357/17, 19, 40, 80, 81, 82; 455/602, 606, 607, 610, 612, 617

[56] References Cited

U.S. PATENT DOCUMENTS

| | | | |
|---|---|---|---|
| 3,480,780 | 11/1969 | List et al. | 250/551 |
| 3,493,760 | 2/1970 | Hoadley | 250/551 |
| 3,562,527 | 2/1971 | Chaimowicz | 250/551 |
| 3,748,548 | 7/1973 | Haisty et al. | 357/19 |
| 3,962,655 | 6/1976 | Selway et al. | 357/76 |
| 4,384,368 | 5/1983 | Rosenfeldt et al. | 250/551 |

OTHER PUBLICATIONS

Inst. Phys. Conf. Ser. No. 63, Chapter 11, Symp. GaAs and Related Compounds, Japan 1981, pp. 515–520, "Materials and Processes for GaAs Integrated Circuits", by F. H. Eisen.

Primary Examiner—David C. Nelms
Attorney, Agent, or Firm—Eugen E. Pacher

[57] ABSTRACT

Two-dimensional semiconductor chips are stacked to form a three-dimensional array in which coupling between chips is effected optically. This permits the use of smaller chips, with a corresponding higher yield, and serves to reduce the chip area required for interconnecting leads. It also reduces the internal interconnection path lengths which, at present, limit the speed of operation.

5 Claims, 6 Drawing Figures

OPTICALLY COUPLED INTEGRATED CIRCUIT ARRAY

TECHNICAL FIELD

This invention relates to integrated circuits (ICs) and, in particular, to integrated circuit arrays.

BACKGROUND OF THE INVENTION

Within the past 20 years the speed at which computers can operate has increased many orders of magnitude while their cost has decreased equally dramatically. All of this has been made possible by the invention of semiconductor devices and the development of integrated circuits. By means of this technology many thousands of circuit elements can be fitted onto a chip of semiconductor material measuring only a fraction of an inch on each side. Typically, hundreds of such circuits are made simultaneously side-by-side, on a common wafer. The yield in such a process, however, tends to decrease as the packing density and the size of each chip is increased. In addition, heat dissipation tends to become a problem as the packing density is increased. Finally, as the number of elements proliferate, more and more of the chip surface area is taken up by the interconnecting leads. On present day ICs, anywhere from 30 to 90 percent of the chip can be so occupied. Furthermore, as the chip size increases, the increased lead lengths become a limiting factor determining the speed at which the device can operate.

It is, accordingly, the broad object of the present invention to derive the advantages of high density ICs without incurring the penalties normally associated with such devices.

SUMMARY OF THE INVENTION

In accordance with the present invention, integrated circuit chips are stacked to form a three-dimensional array in which coupling between chips is effected optically. This permits the use of smaller, less densely packed chips, thus resulting in correspondingly higher yields. In addition, the use of smaller, less densely packed chips serves to reduce the chip surface area required by the interconnecting leads. It also reduces the lengths of the interconnection lead, thereby permitting higher operating speeds.

DETAILED DESCRIPTION

Figure 1:
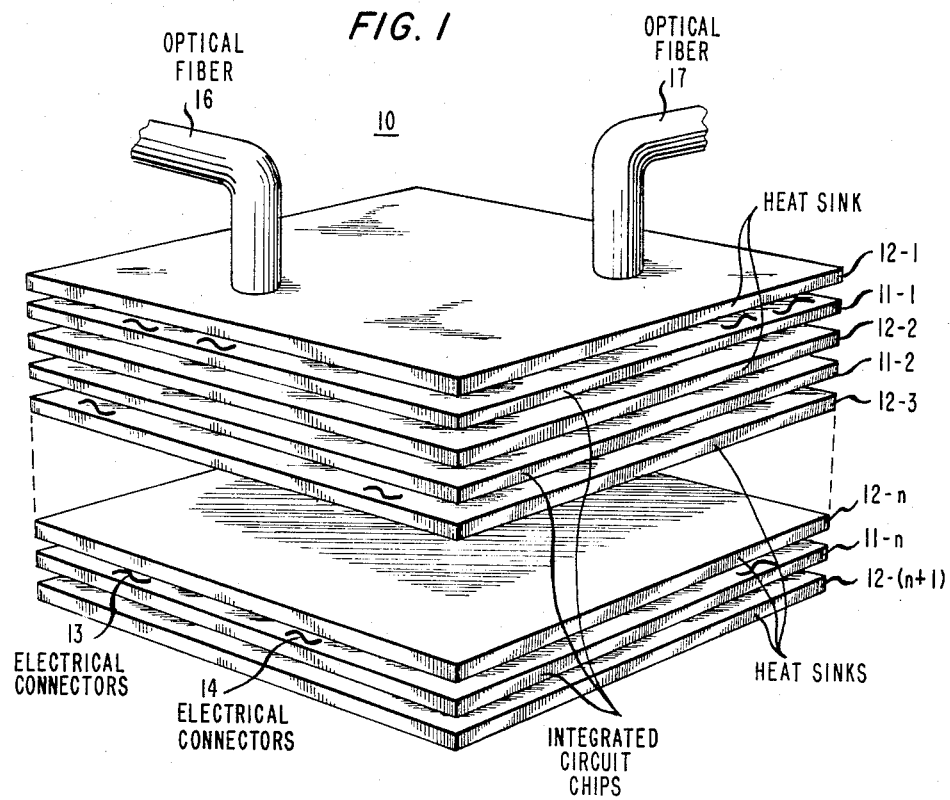
FIG. 1 shows an exploded view of an optically coupled array of integrated circuits.

Referring to the drawings, FIG. 1 shows an exploded view of a three-dimensional array 10 of n integrated circuit chips 11-1, 11-2 . . . 11-n, in accordance with the present invention. The chips are advantageously disposed between heat sinks 12-1, 12-2 . . . 12-(n+1) with their broad planar surfaces parallel to and in contact with the planar surfaces of the adjacent heat sinks.

Figure 2:
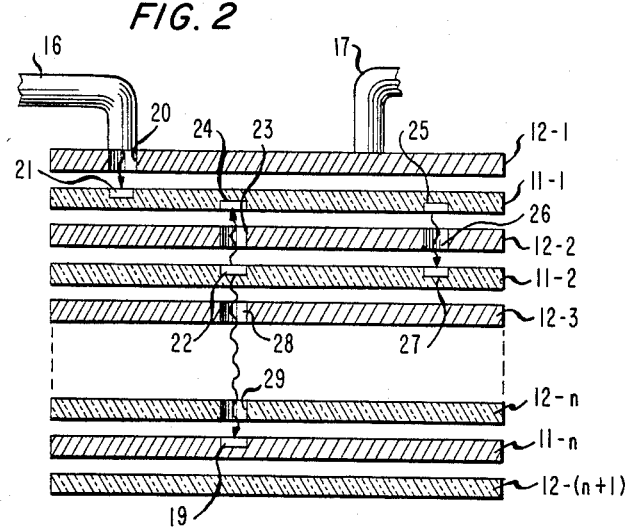
FIG. 2 shows a section through the array of FIG. 1.

Each of the chips is provided with the necessary electrical connectors, such as 13 and 14, for providing electrical power to the circuits and, where appropriate, for coupling information signals into and out of the array. Signals can also be coupled into and out of the array optically by means of optical fibers 16 and 17. In addition, optical means are employed to couple signals among the integrated circuits of the array. This is shown in greater detail in FIG. 2 which is a section taken through the array. Using the same identification numerals used in FIG. 1 to identify corresponding components, FIG. 2 shows fiber 16 extending through an aperture 20 in heat sink 12-1 and a photodetector 21 incorporated into chip 11-1 for receiving radiant energy emitted from fiber 16. Also shown incorporated into chips 11-1 and 11-2 are LEDs 22 and 25 and associated photodetectors 19, 24 and 27. Radiant energy is coupled between LED 22 and detector 24 through an aperture 23 in heat sink 12-2. Similarly, radiant energy is coupled between LED 25 and detector 27 through an aperture 26 in heat sink 12-2. In addition, radiant energy from source 22 is shown directed downward to a detector 19 on chip 11-n through apertures, such as 28 and 29, in the intervening chips and heat sinks. By this means signals can be readily coupled among the chips without requiring conductive leads that, in prior art chips, must be run from the originating portion of the integrated circuit to the perimeter of the first chip, through an external connection to the perimeter of the second chip, and then to the receiving location of the second integrated circuit. In addition to using up real estate on the chips, the lead lengths involved in making these connections tend to place an upper limit upon the operating speed of the resulting circuit.

IC chips 11-1 through 11-n are substantially similar to present day IC chips except they are advantageously made from direct-gap semiconductor materials (i.e., GaAs, InP and InGaAsP) so that small, low-power LEDs and photodetectors can be included at various locations thereon. (See, for example, the article by F. H. Eisen entitled "Materials and processes for GaAs integrated circuits," *Inst. Phys. Conf.* Ser. No. 63 Chapter 11 Paper presented at *Symp. GaAs and Related Compounds,* Japan, 1981.)

Figure 3:
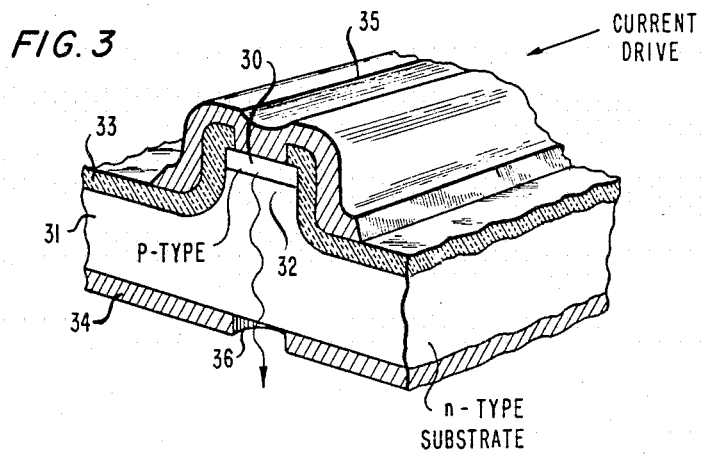
FIGS. 3, 4 and 5 show illustrative embodiments of LEDs and photodetectors for use in such arrays.
Figure 4:
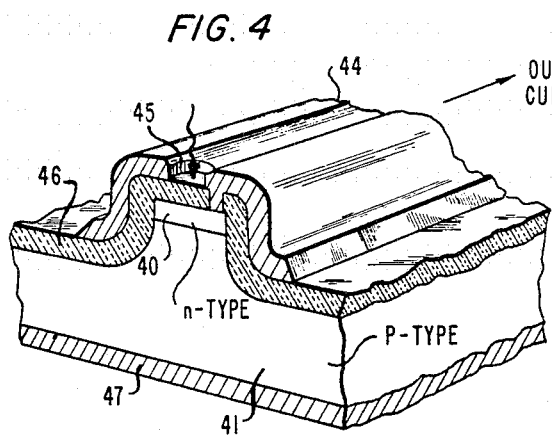
Figure 5:
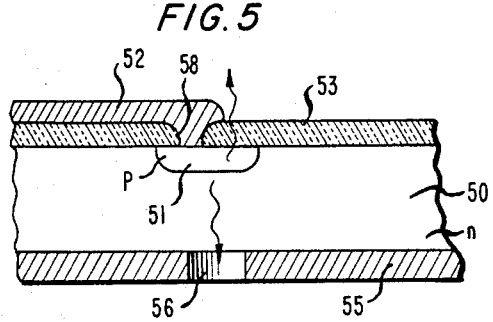

FIGS. 3 through 5 show in greater detail illustrative LED and photodetector structures for practicing the present invention. In the embodiment of FIG. 3, an epitaxial layer 30 of a first conductivity material, deposited upon a mesa 32 of opposite conductivity substrate material 31, forms a photodiode. For purposes of illustration, the substrate is characterized as n-type and the epitaxial layer as p-type material. The upper surface is covered with an insulating layer 33 in which an aperture is formed above layer 30. Ohmic contact to the photodiode is made by depositing a first metallic (i.e., gold) layer 35 above layer 30 and a second metallic layer 34 on the bottom surface of the substrate 31. Radiant energy is coupled into or out of the diode through an aperture in layer 34.

When used as a signal emitter, a drive current is applied to upper contact 35, and radiant energy is extracted through the aperture 36 in the lower contact 34, as shown in FIG. 3. If used as a detector, radiant energy is directed onto the diode through the aperture in contact 34, and the resulting output current appears on contact 35.

To focus the radiated energy derived from the photodiode, and thus preclude spurious cross coupling to other photodetectors, contact 35 advantageously extends down the side of mesa 32.

The embodiment of FIG. 4 is basically the same as FIG. 3 comprising a layer 40 of n-type semiconductor material deposited upon a mesa of the underlying substrate 41 of p-type material to form a photodiode. Ohmic contact is made to the diode by means of a first metallic connector 44 through an aperture in an insulating layer 46, and a second metallic connector 47 in contact with the lower surface of substrate 41. In this embodiment, radiant energy is coupled into and out of the photodiode through an aperture 45 in the upper metallic connector 44.

FIG. 5 shows a planar diode configuration for use in connection with the present invention in which the photodiode is formed by diffusing a suitable dopant into the chip substrate 50 to form a region of opposite conductivity, for example, a p-type region 51 in an n-type substrate. A metallic connector 52 makes ohmic contact to region 51 through an aperture 58 in insulating layer 53. A second metallic connector 55 makes ohmic contact to the bottom surface of the substrate.

In this embodiment, radiant energy can be coupled into or out of the diode through insulating layer 53 and/or through an aperture 56 in the second metallic connector 55. In this way, optical coupling can be simultaneously affected between a chip and two other, oppositely situated chips in the array, or between a chip and a fiber, or any combination thereof.

It is an advantage of the invention that a large number of relatively small ICs can be assembled in a single package in a way that does not penalize speed. Inasmuch as the manufacturing yield for small chips is always greater than the yield of larger chips, a greater percentage of processed wafers could be utilized in an optically coupled array, in accordance with the invention, than would be the case if the same function was incorporated into a single larger chip. In addition, the packages for present day ICs are typically much larger than the IC chip within because of the need to mechanically fan-out the many electrical connections. An optically coupled chip array, by contrast, has fewer external connections and can be designed so as to require only external d.c. connections and an optical fiber ribbon. Thus, smaller packages are obtainable.

Figure 6:
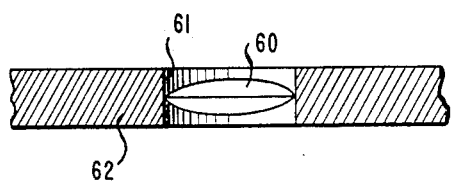
FIG. 6 shows the use of focussing means in a coupling aperture.

As shown in FIGS. 1 and 2, heat sinks can be provided between chips. If required, the heat sinks can be made thick enough to contain ducts for coolant fluids. In addition, a lens can be included in the coupling aperture to increase the optical coupling efficiency, as illustrated in FIG. 6 wherein lens 60 is shown disposed in a coupling aperture 61. The latter can be located in either a chip or a heat sink through which energy is being transmitted. The use of spherical glass lenses would eliminate the need for orientational alignment during manufacture.

What is claimed is:

1. An integrated circuit array comprising:
    a plurality of integrated circuit chips, the plurality comprising a first chip and a second chip, each chip having a pair of broad, planar surfaces;
    said chips being stacked with their broad, planar surfaces substantially parallel to each other;
    and means for coupling between said chips, the means comprising a multiplicity of radiation sources and radiation detectors distributed among said chips, at least a first radiation source and a first radiation detector located on the first chip, and at least a second radiation source and a second radiation detector located on the second chip, such that the first radiation source can couple radiation to at least the second radiation detector, and the second radiation source can couple energy to at least the first detector.

2. The array according to claim 1 wherein a heat sink separates adjacent pairs of chips.

3. The array according to claim 2 including means for coupling radiant energy through said heat sink.

4. The array according to claim 3 wherein said means is an aperture.

5. The array according to claim 3 wherein said means comprises an aperture and focussing means disposed within said aperture.

* * * * *